United States Patent [19]
Steinle

[11] 3,947,677
[45] Mar. 30, 1976

[54] EMERGENCY ILLUMINATION

[76] Inventor: Leo D. Steinle, Dorrance, Kans. 67634

[22] Filed: Dec. 6, 1973

[21] Appl. No.: 422,262

[52] U.S. Cl. .............................. 240/8.1 R; 240/1 EL
[51] Int. Cl.² ............................................. B60Q 1/26
[58] Field of Search ............ 240/7.1 A, 7.1 E, 7.1 F, 240/8.1 R, 8.1 A, 8.18, 8.2, 8.24, 8.3, 106.1 R, 1 EL, 151; 340/67, 73, 76, 89, 100

[56] References Cited
UNITED STATES PATENTS

| | | | |
|---|---|---|---|
| 2,786,935 | 3/1957 | Geary | 240/8.1 R |
| 3,005,089 | 10/1961 | Robbins | 240/8.3 X |
| 3,093,320 | 6/1963 | Knapp | 240/8.2 |
| 3,227,868 | 1/1966 | Morgan | 240/8.2 |
| 3,274,382 | 9/1966 | Fattori | 240/8.18 X |
| 3,330,949 | 7/1967 | Bush | 240/10.65 X |
| 3,413,458 | 11/1968 | Barefoot | 240/10 R |
| 3,454,757 | 7/1969 | Bell | 240/8.1 R X |
| 3,492,639 | 1/1970 | Bevacqua | 340/67 |
| 3,510,839 | 5/1970 | Elliott et al. | 340/67 |
| 3,662,336 | 5/1972 | Suzuki et al. | 340/67 X |
| 3,745,524 | 7/1973 | Suzuki | 340/76 |
| 3,818,213 | 6/1974 | Rockford | 240/10 R |

Primary Examiner—L. T. Hix
Assistant Examiner—Alan A. Mathews
Attorney, Agent, or Firm—Phillip A. Rein

[57] ABSTRACT

This invention relates to an emergency illumination system which is attachable to a fender portion of a vehicle and operable to both light the area adjacent and about the wheel structure plus outwardly therefrom to aid in changing a flat tire and illumination during emergencies. The emergency illumination system in one embodiment includes a lighting means having a light assembly attached at each fender portion and operable through an electrical means to either (1) illuminate all the wheel well areas by turning on an emergency flasher system of the vehicle; (2) operate a special switch on a turn indicator member to energize all of the light assemblies; and (3) having a switch member operable to be connected with the respective turn indicator lights so as to illuminate the forward ones of the light assemblies for reading house numbers and aid visually when turning corners. The emergency illumination system can be used for clearance lights on trucks, campers, etc. and constructed of various colors. In another embodiment, the emergency illumination system includes a lighting means having a self contained battery member to provide an independent power supply to each light assembly.

2 Claims, 5 Drawing Figures

EMERGENCY ILLUMINATION

Numerous types of emergency fender lights for vehicles are noted in the prior art but the present complicated structures for concealing and revealing the emergency light member requiring extensive installations costs. Additionally, the prior art structures are easily susceptible to damage from rocks thrown by the vehicle's tires and must be covered with a protective shield. The use of retractable protective shields are undesirable as such becomes rusty and, thus, not easily movable from the covered to the operative, open position. Additionally, the prior art emergency fender lighting systems are expensive to manufacture and difficult to install requiring substantial alterations of the vehicle on which the system is being installed.

In one preferred embodiment of this invention, an emergency illumination system is provided including a lighting means interconnected by an electrical means to a vehicle power system. The light means includes a housing means having a lighting assembly therein attached at each fender well area to an edge of a fender section. The housing means includes a housing member secured by connector members to the edge of the fender section. The housing member is preferably of a generally semicircular disc shape and constructed of a clear plastic material having upright parallel sidewalls interconnected about its periphery by an endwall and having an upper top, flat wall to be placed against the edge of the fender section. The arcuate end wall is opaque so that the light is restrained so as to emit only through the parallel sidewalls. Additionally, the arcuate end wall is provided on each opposite side with stepped portions having a flat surface with a hole therein for receiving the connector members which are metal screw members. The light assembly is molded in the plastic housing means and includes a bulb member connected to a ground wire and a power wire. The ground wire is connected to a connector tab mounted on the outer surface of one of the stepped portions to receive one of the screw members therethrough for grounding to the metal portion of the edge of the fender section. The power wire is similarly connected to a terminal member exposed on one sidewall of the housing member having a screw member threaded therethrough adapted to receive an input power wire. The vehicle power system includes a conventional battery member connected to ground and connected through an ignition switch member to energize a flasher switch and a turn indicator lever. The electrical means of this invention includes a supply conductor assembly connected to a control means. The supply conductor assembly includes, at each one of the light assemblies, the bulb ground wire connected through one of the screw members to the edge of the fender section and an additional wire member connected in series to all of the various light assemblies plus connected to the turn indicator lever. A special switch can be mounted on the turn indicator lever such as on the outer end thereof so that when depressed, the series wire member is connected to the battery member for turning on all of the light assemblies. In an alternate supply conductor assembly, the power line can be connected to the emergency flasher system required on automobiles so that when the special switch is actuated, the power line to the flasher assembly is used to energize the lighting assemblies. The flasher switch can be a two stage function so that when pulled out completely, the light assemblies would flash along with the turn indicator lights so as to make the vehicle readily visible in all directions during an emergency.

In another embodiment of the electrical means, a switch can be supplied on the turn indicator lever so that the front ones of the light assemblies on respective sides of the vehicle can be energized whenever the turn indicator is energized. The left or right front light assembly would be energized by the turn indicator lever when the headlight switch is actuated to provide substantial visual aid in turning corners and for reading house numbers.

In another embodiment of this invention, a self contained lighting system is provided including a lighting means connected to an electrical means with the lighting means having a housing means with a light assembly therein. The housing means is of that described in the prior embodiment having the housing member provided with upright sidewalls, a flat top wall, and an arcuate end wall. The light assembly includes a bulb member interconnected by a power wire and a ground wire to a battery member and having the power wire controlled by a toggle switch member. It is noted that the lighting means is completely enclosed within the housing member so as to be independently operable and not connected to the vehicle power supply.

One object of this invention is to provide an emergency illumination system which is provided with individual light assemblies attachable to respective fenders to illuminate both the area within a fender well section and an area external therefrom to aid in the changing of the tires and special illumination for other emergencies.

One further object of this invention is to provide an emergency illumination system having a lighting means interconnected by an electrical means and a vehicle power supply, being operable to (1) simultaneously illuminate all light assemblies in the respective fender wells; or (2) illuminate a respective light assembly on energization of a turn indicator lever for aid in turning corners; or (3) attached to a flasher switch circuit of the vehicle operable to provide constant light therefrom or flash with the parking lights to aid in the emergency signaling.

Another object of this invention is to provide an emergency illumination system having an independent battery operated light assembly mounsed within an unbreakable housing means which is readily attachable to an outer edge of a fender section on a vehicle requiring little effort to install same.

Still, another object of this invention is to provide a self contained lighting system having a battery power supply with a switch member to energize as necessary for illuminating the respective fender well section of a vehicle or used as a clearance light on trucks and campers.

Still, another object of this invention is to provide an illumination system having a lighting assembly mounted in a housing member, the housing member constructed of a solid plastic material that (1) resists breakage even when struck directly with a hard blow, and (2) has outer smooth surfaces so as to prevent the clinging of dirt and the like thereto.

One further object of this invention is to provide an emergency illumination system which is easy to install, reliable in operation, economical to manufacture, and simple to use.

Various other objects, advantages, and features of the invention will become apparent to those skilled in the art from the following discussion, taken in conjunction with the accompanying drawings, in which.

Figure 1:
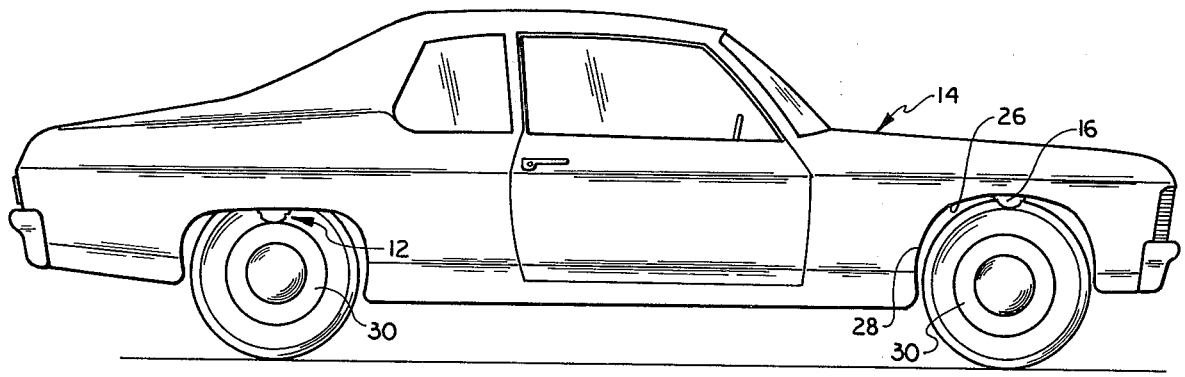
FIG. 1 is a side elevational view of a vehicle having the emergency illumination system of this invention attached thereto.

The following is a discussion and description of preferred specific embodiments of the emergency illumination system of this invention, such being made with reference to the drawings, whereupon the same reference numerals are used to indicate the same or similar parts and/or structure. It is to be understood that such discussion and description is not to unduly limit the scope of the invention.

In one preferred embodiment of this invention and referring to FIG. 1, an emergency illumination system, indicated generally at 12, is shown as attached to an automotive vehicle 14. The emergency illumination system 12 includes a main lighting means 16 interconnected by an electrical means 18 to a vehicle power supply 20. The lighting means 16 includes a housing means 22 having a light assembly 24 therein. Each housing means 22 is attached to respective ones of a lower edge 26 of each fender section 28. It is noted that the lighting means 16 is mounted over and outward from respective ones of vehicle wheel assemblies 30 to provide illumination both inwardly and outwardly from the fender edge 26 as will be explained.

Figure 2:
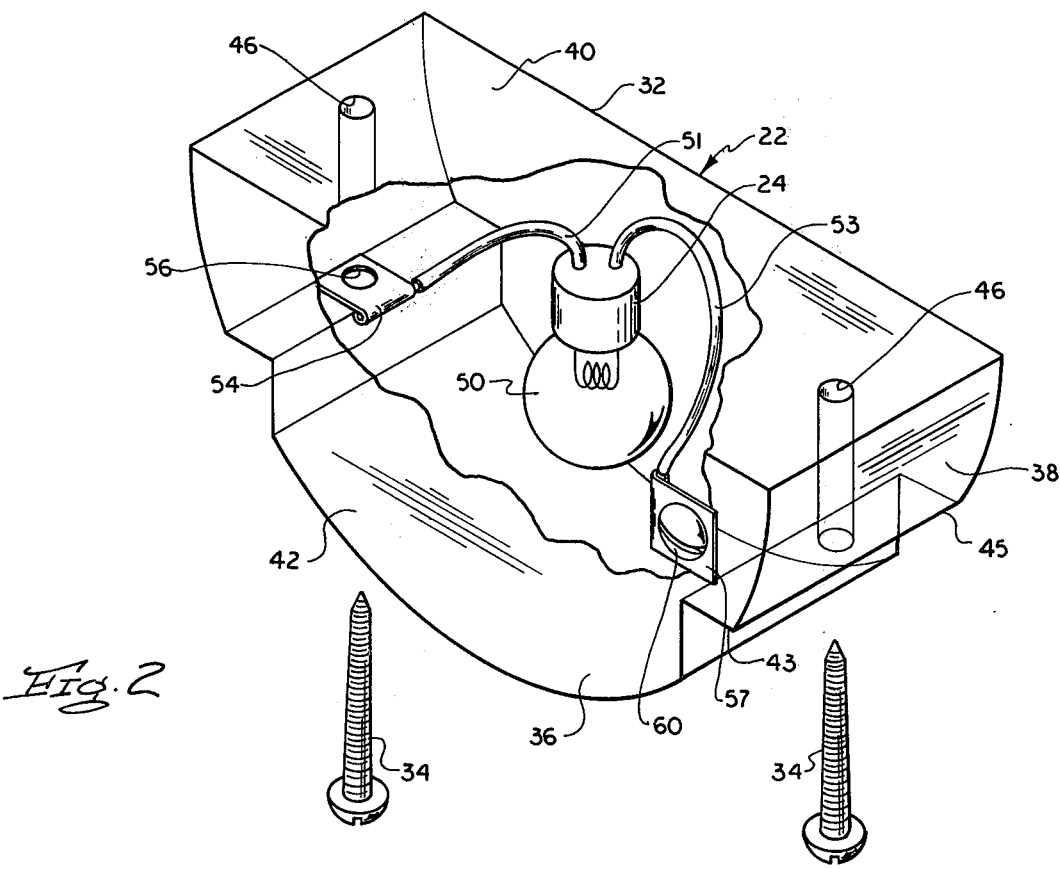
FIG. 2 is an enlarged exploded perspective view of a light assembly of the emergency illumination system of this invention.

As shown in FIG. 2, the housing means 22 is preferably constructed of a clear plastic material being a lucite material or the like and consists of a housing member 32 with connector members 34 for securing to the fender edge 26. The housing member 32 is provided with vertical, upright parallel sidewalls 36 which are interconnected about its periphery by an arcuate endwall 38 integral with a flat top wall 40. The sidewalls 36 have a translucent surface 42 to permit light to be extended outwardly therethrough. The arcuate end wall 38 is opaque as by surface preparation so as to prevent transmitting of light therefrom and concentrate light emission through the sidewalls 36. The arcuate end wall 38 is of a generally semi-circular shape except having opposed stepped portions 43, each provided with a flat surface 45 to receive the connector members 34 therethrough and thereagainst. The connector members 34 are shown as elongated metal screws which are adapted to be placed through respective spaced, vertical holes 46 securing the housing means 22 against the edge of the respective fender sections 28.

The light assembly 24 is molded within the housing member 32 and includes a bulb member 50 having a ground wire 51 and a power wire 53 connected thereto. The bulb member 50 is a substantial conventional type being of 12 volt utilized in power systems in most vehicles. The ground wire 51 has its outer end connected to a metal connector tab 54 having a central hole 56 to be placed about one of the holes 46 for grounding to a respective metal screw or connector member 34 to the fender section 28. The power wire 53 is connected to a connector tab 57 and a connector bolt 60 molded in the plastic housing member 32. The connector bolt 60 is to receive a wire member thereon to supply power needed for the light assembly 34.

Figure 3:
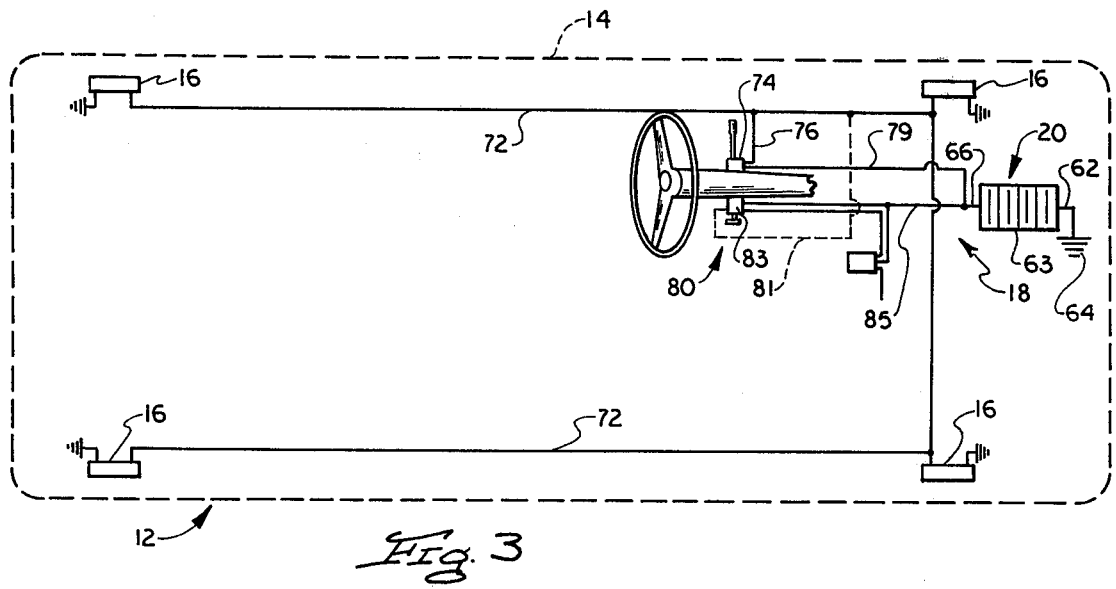
FIG. 3 is a schematic diagram illustrating an electrical means of the emergency illumination system of this invention.

As shown in FIG. 3, the vehicle power supply 20 includes a 12 volt battery 63 having one terminal connected by a line 62 to ground indicated at 64 and the other terminal connected by a line 66 to the ignition system of the vehicle 14.

The electrical means 18 includes a supply conductor assembly 68 connected to a control means 70 to control operation of the light assemblies 24. The supply conductor assembly 18 includes each light assembly 24 connected to a ground 64 by use of the connector tab 54 and a respective screw member 34. The light assemblies 24 are connected through the other connector tabs 57 and power wires 53 in series through a common line 72. As shown in one embodiment of the control means 70, the common line 72 can be connected to a turn indicator lever 74 through line 76 which, in turn, has power supplied thereto from the battery 63 through a conductor line 79. The turn indicator lever 74 has a push button on the outer end thereof which may be actuated to close a circuit from the battery 63 through lines 79, 76, and 72 to energize the light assemblies 24 over respective ones of the wheel assemblies 30.

In another embodiment of a control means 80 indicated in dotted lines in FIG. 3, a conductor line 81 is connected to a flasher switch 83 which is supplied with power through a line 85 from the battery 63. The flasher switch 83 operates to continuously flash the tail lights and parking lights as a safety feature during an emergency situation. The flasher switch 83 can be dual positional so that in one position will work as normal but, in a second position, the flasher switch 83 will falsh the tail lights and parking lights and energize the respective light assemblies 24 in a non-flashing condition.

Figure 4:
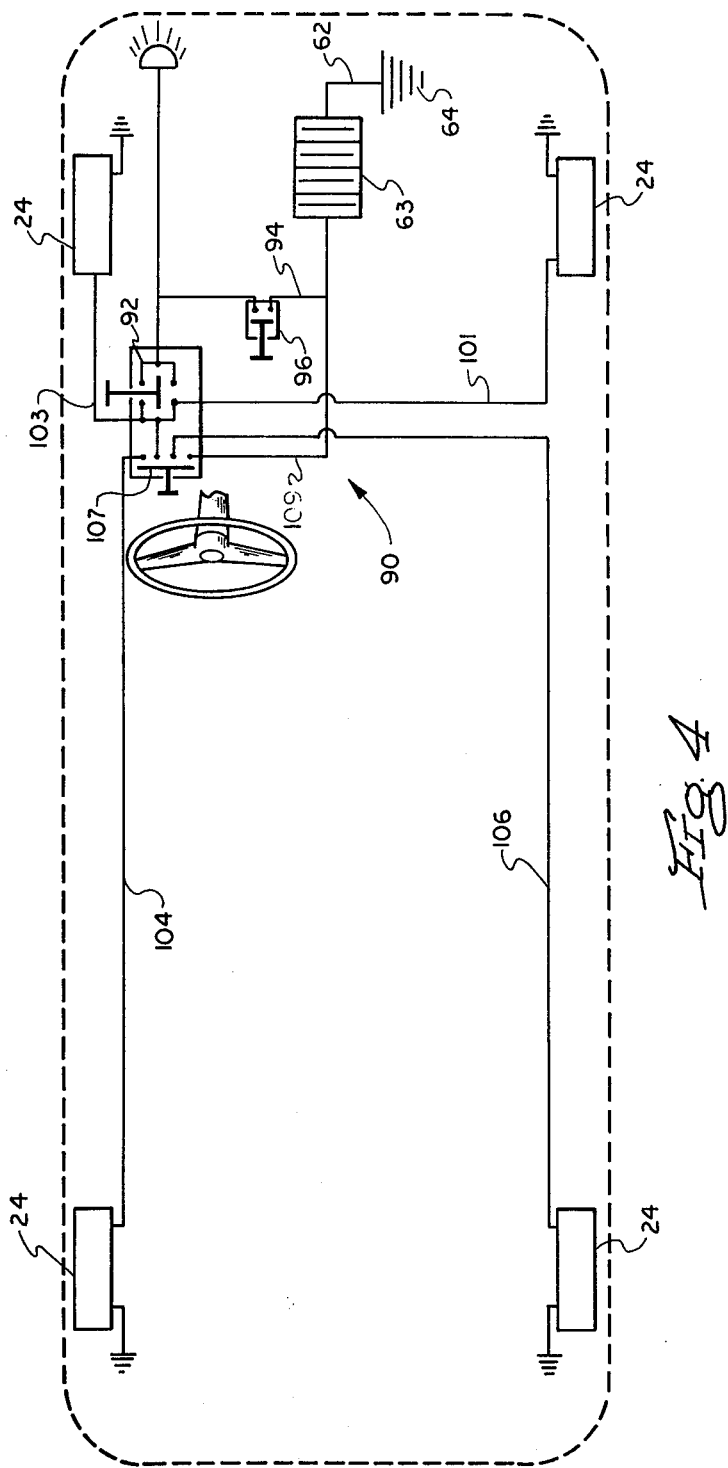
FIG. 4 is a schematic diagram of a second embodiment of an electrical means of the emergency illumination system of this invention.

As shown in FIG. 4, another embodiment of a control means 90 includes a special turn indicator switch 92 which would be operable to actuate respective forward ones of the light assemblies 24 on movement of a turn indicator lever on turning in respective directions of the light assemblies 24. More particularly, this control means 90 includes the battery 63 connected by the line 62 to ground 64; a power line 94 from the battery 63 connected to a headlight switch 96 to the turn indicator switch 92; forward ones of light assemblies 24 connected to the turn indicator switch 92 by lines 101 and 103; and rear ones of light assemblies 24 are connected by lines 104 and 106 to a push button switch 107. The turn indicator switch 92 is operable (1) in one condition as a normal switch to flash respective turn signal lights; (2) in a second condition whereby, if the headlight switch 96 is energized and the turn indicator switch 92 is operated, the respective ones of the light assemblies 24 in the direction of turning will be energized; and (3) in a third condition, the push button switch 107 is operable to energize all of the light assemblies 24 from a power line 109. The circuit in FIG. 4 would be very desirable especially since most automobiles do not have this lateral lighting feature and provides safety in turning as oncoming automobiles could readily note your intentions.

Figure 5:
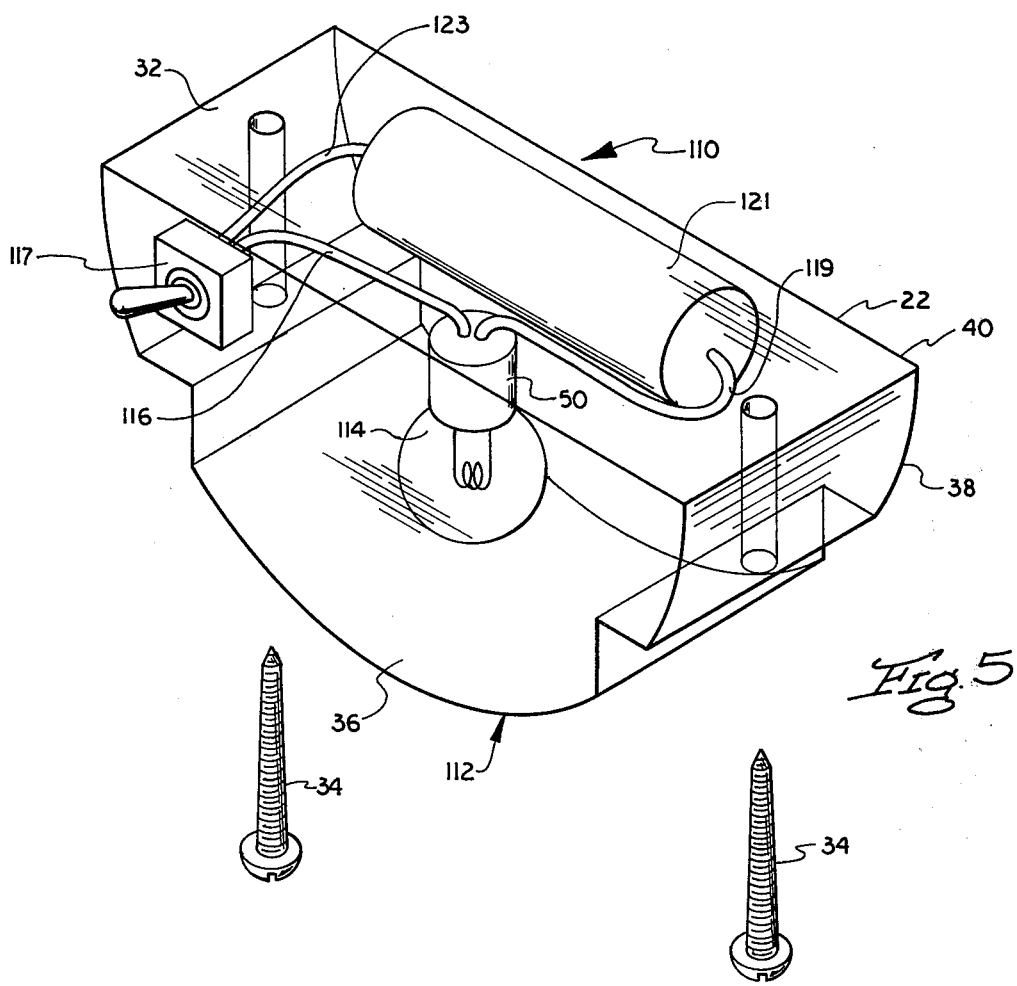
FIG. 5 is an enlarged perspective view of a self contained illumination system being a second embodiment of this invention.

In a second embodiment being a self contained illumination system 110 as shown in FIG. 5, a lighting means 112 is provided attachable to the edge 26 of the fender section 28. The lighting means 112 includes a light assembly 114 mounted within the housing means 22. The housing means 22 includes the housing member 32 secured as by the connector members 34 to the fender section 28. The housing member 32 includes the parallel upright sidewalls 36 with integral top wall 40 and arcuate end wall 38. The light assembly 114 includes the bulb member 50 which is connected by a wire 116 to a switch member 117 through a second wire 119 to a self sufficient battery member 121. The switch member 117 is operable in the closed condition to convey current through a line 123 from the battery member 121 to illuminate the bulb member 50.

In the use and operation of the emergency illumination system 12 as shown in FIG. 1, the respective light assemblies 24 are easily mounted in the proper position on the fender edge 26 and connected to a power supply which can be operated either through (1) a turn indicator lever, (2) a flasher switch, or (3) an independent switch for desired illumination.

Additionally, the turn indicator switch 92 can have a special switch member 107 thereon as shown in FIG. 4 so can be energized simultaneous as an emergency system or the front two light assemblies 24 operate respectively with the turn indicator lever 92 to achieve illumination for turning corners, reading house numbers, and the like.

In the use of the self contained illumination system 110 as shown in FIG. 5, each housing means 22 with the light assembly 114 therein is readily attached to the respective fender edge 26. The respective switch member 117 is operable to energize independently the light assemblies 114 as required.

The self contained illumination system can be constructed with space age materials and the battery would last for the life of the vehicle.

It is noted that the lighting means of this invention is constructed of a clear plastic having an opaque outer arcuate edge so that the light therefrom is transmitted through the parallel upright sidewalls. This provides for the desirable and substantial illumination of the wheel well area for changing a tire plus presents substantial lighting outwardly therefrom for an emergency signal. Also, the illumination system of this invention places substantial light outwardly therefrom so as to present necessary light for administrating first aid and other such uses. The illumination system of this invention may be operable with the turn indicator signals so as to provide lighting for turning corners or reading house numbers.

Although the emergency illumination system 12 and self contained illumination system 110 have been described as secured to the fender section 28 of a automatic vehicle 14, each lighting means 16 may be mounted on the side of large trucks, buses, campers, and other such vehicles in order to act as clearance lights. This provides a system of economical construction allowing simplicity of replacement and durability. The housing means 22 can be constructed of colored, transparent plastic such as yellow, red, etc. to provide the proper safety lighting and illumination.

While the invention has been described in conjunction with preferred specific embodiments thereof, it will be understood that this description is intended to illustrate and not to limit the scope of the invention, which is defined by the following claims.

I claim:

1. An emergency illumination system mounted on wheel assembly areas of a vehicle, comprising:
   a. a lighting means connected to respective fender sections of the vehicle, said lighting means having a light assembly mounted within a housing means,
   b. said housing means being of a solid, molded, plastic construction having a housing member with upright, parallel sidewalls integral with an end wall and a top wall,
   c. said sidewalls being made of a transparent material and said end wall having an opaque covering to allow light from said light assembly through said sidewalls only to illuminate the respective wheel assembly area and an area outward therefrom,
   d. said end wall being opaque to direct light through said sidewalls,
   e. said light assembly enclosed by the molded plastic construction of said housing means for durability, and
   f. said fender section having a horizontally extended fender edge and said top wall secured against said fender edge.

2. An emergency illumination system mounted on a vehicle as safety or clearance lighting, comprising:
   a. a lighting means connected to respective fender sections of said vehicle having a light assembly mounted within a housing means;
   b. said housing means being of a solid, molded construction having a housing member with upright, parallel sidewalls integral with an end wall and a top wall,
   c. said sidewalls being made of a transparent material and said end wall having an opaque covering to allow light from said light assembly through only said sidewalls to illuminate an area thereabout,
   d. said light assembly having a storage battery molded within said housing means to provide an independent power source so as to be a self contained emergency illumination system,
   e. said housing member of semi-circular disc shape being dirt and breakage resistant, and
   f. said sidewalls being vertically extended smooth, parallel surfaces to be self cleaning and resistant to adherence of dirt thereto.

* * * * *